United States Patent [19]
Maybee et al.

[11] Patent Number: 5,870,819
[45] Date of Patent: Feb. 16, 1999

[54] APPARATUS FOR ASSEMBLING A HEAT EXCHANGER CORE

[75] Inventors: William J. Maybee, Brighton; Eddy G. Mizzi, Allen Park; James C. Rollinson, Westland; Daniel J. Stark, Woodhaven; Ronald Pardi; Walter Kowalcski, both of Canton; Paul Krause, Brighton, all of Mich.

[73] Assignees: Progressive Tool & Industries Company, Southfield; Ford Motor Company, Dearborn, both of Mich.

[21] Appl. No.: 792,652

[22] Filed: Jan. 31, 1997

[51] Int. Cl.⁶ .................................................. B23P 15/26
[52] U.S. Cl. ................................................. 29/726; 29/726
[58] Field of Search .................................. 29/727, 726.5, 29/726, 33 G, 33 T, 890.043, 890.047, 890.039, 890.044

[56] References Cited

U.S. PATENT DOCUMENTS

| | | |
|---|---|---|
| 875,746 | 1/1908 | Stolp . |
| 1,591,322 | 7/1926 | Kararagin . |
| 2,006,383 | 7/1935 | Boerger . |
| 2,403,466 | 7/1946 | Stutz . |
| 2,410,140 | 10/1946 | Young . |
| 2,517,370 | 8/1950 | Young . |
| 3,574,917 | 4/1971 | Miyazaki . |
| 3,733,673 | 5/1973 | Young et al. .......................... 29/202 R |
| 4,321,739 | 3/1982 | Martin et al. .......................... 29/157.3 |
| 4,486,933 | 12/1984 | Iwase et al. ............................ 29/157.3 |
| 4,611,375 | 9/1986 | Zapawa .................................. 29/157.3 |
| 4,637,132 | 1/1987 | Iwase et al. ............................... 29/726 |
| 4,637,133 | 1/1987 | Freeman et al. .......................... 29/727 |
| 4,901,414 | 2/1990 | Breda et al. .......................... 29/890.04 |
| 5,014,422 | 5/1991 | Wallis ................................ 29/890.044 |
| 5,022,814 | 6/1991 | Breda et al. ............................. 414/799 |
| 5,120,189 | 6/1992 | Breda et al. ............................. 414/786 |
| 5,687,473 | 11/1997 | Tokura ...................................... 29/727 |

*Primary Examiner*—I. Cuda
*Attorney, Agent, or Firm*—Young & Basile, P.C.

[57] ABSTRACT

An apparatus assembles a heat exchanger core having first and second side plates. The first and second side plates cooperate with first and second end plates to sandwich a plurality of layered tubes and fin plates therebetween. The apparatus includes a lifting mechanism for stacking the tubes and fin plates with respect to one another to define a layered stack having opposite sides and opposite ends. A side plate assembling mechanism associates the first and second side plates on opposite sides of the layered stack. An end plate assembling mechanism associates the first and second end plates on opposite ends of the layered stack. A method for assembling a heat exchanger core includes the steps of stacking tubes and fin plates with respect to one another to define a layered stack having opposite sides and opposite ends, associating first and second side plates on opposite sides of the layered stack, and associating first and second ends plates on opposite end of the layered stack to form a completed heat exchanger core.

17 Claims, 14 Drawing Sheets ns between the various stations of the apparatus according to the present invention.

APPARATUS FOR ASSEMBLING A HEAT EXCHANGER CORE

FIELD OF THE INVENTION

The present invention relates to the automated assembly of heat exchanger cores having a plurality of layered tubes and fin plates sandwiched between first and second side plates and first and second end plates.

BACKGROUND OF THE INVENTION

Currently, the assembly of heat exchanger cores is accomplished in a manual assembly procedure, where a worker manually stacks a plurality of layered tubes and fin plates with respect to one another. The manually assembled stack is held in place by attaching a peripheral set of side and end plates with respect to one another to hold the manually assembled heat exchanger core in the assembled condition. This manual assembly process is extremely labor intensive and costly. In addition, it is difficult to maintain the amount of production output desired using this manual assembly process.

SUMMARY OF THE INVENTION

It is desirable in the present invention to provide an apparatus and method for automated assembly of a heat exchanger core. The heat exchanger core to be automatically assembled desirably includes a plurality of layered tubes and fin plates sandwiched between first and second side plates, and held in the assembled condition by attachment of the side plates to first and second end plates. It is desirable in the present invention to increase production output through automated assembly of the heat exchanger cores. In addition, it is desirable in the present invention to decrease the amount of manual labor required in order to assembly the heat exchanger cores. It is also desirable in the present invention to provide an automatically assembled heat exchanger core that will meet or exceed the design limitations of the previously manually assembled heat exchanger core.

The present invention discloses an apparatus for assembling a heat exchanger core having first and second side plates. The side plates cooperate with first and second end plates to sandwich a plurality of layered tubes and fin plates disposed between the side plates and the end plates. The apparatus according to the present invention includes lifting means for stacking the tubes and the fin plates with respect to one another to define a layered stack having opposite sides and opposite ends. Side plate assembling means is provided for associating the first and second side plates on opposite sides of the layered stack. End plate assembly means is provided for associating the first and second end plates on opposite ends of the layered stack.

The present invention also encompass a method for assembling a heat exchanger core having first and second side plates. The side plates cooperate with first and second end plates to sandwich a plurality of layered tubes and fin plates therebetween. The method according to the present invention includes the steps of stacking the tubes and the fin plates with respect to one another on lifting means to define a layered stack having opposite sides and opposite ends. The method also includes the step of associating the first and second side plates on opposite sides of the layered stack with side plate assembling means, and associating the first and second end plates on opposite ends of the layered stack with end plate assembling means.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
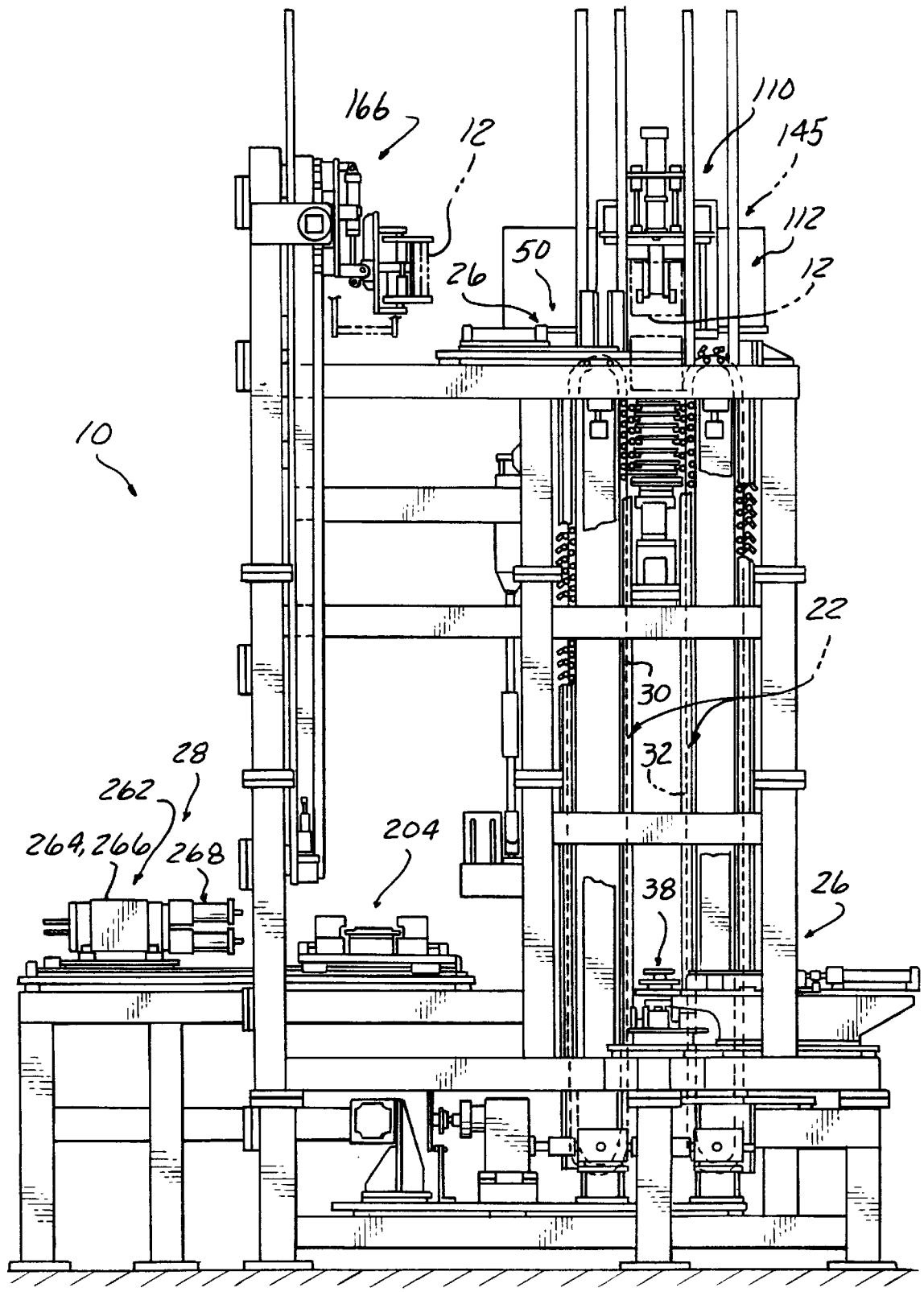
FIG. 1 is a front elevational view of an apparatus for assembling a heat exchanger core according to the present invention.
Figure 2:
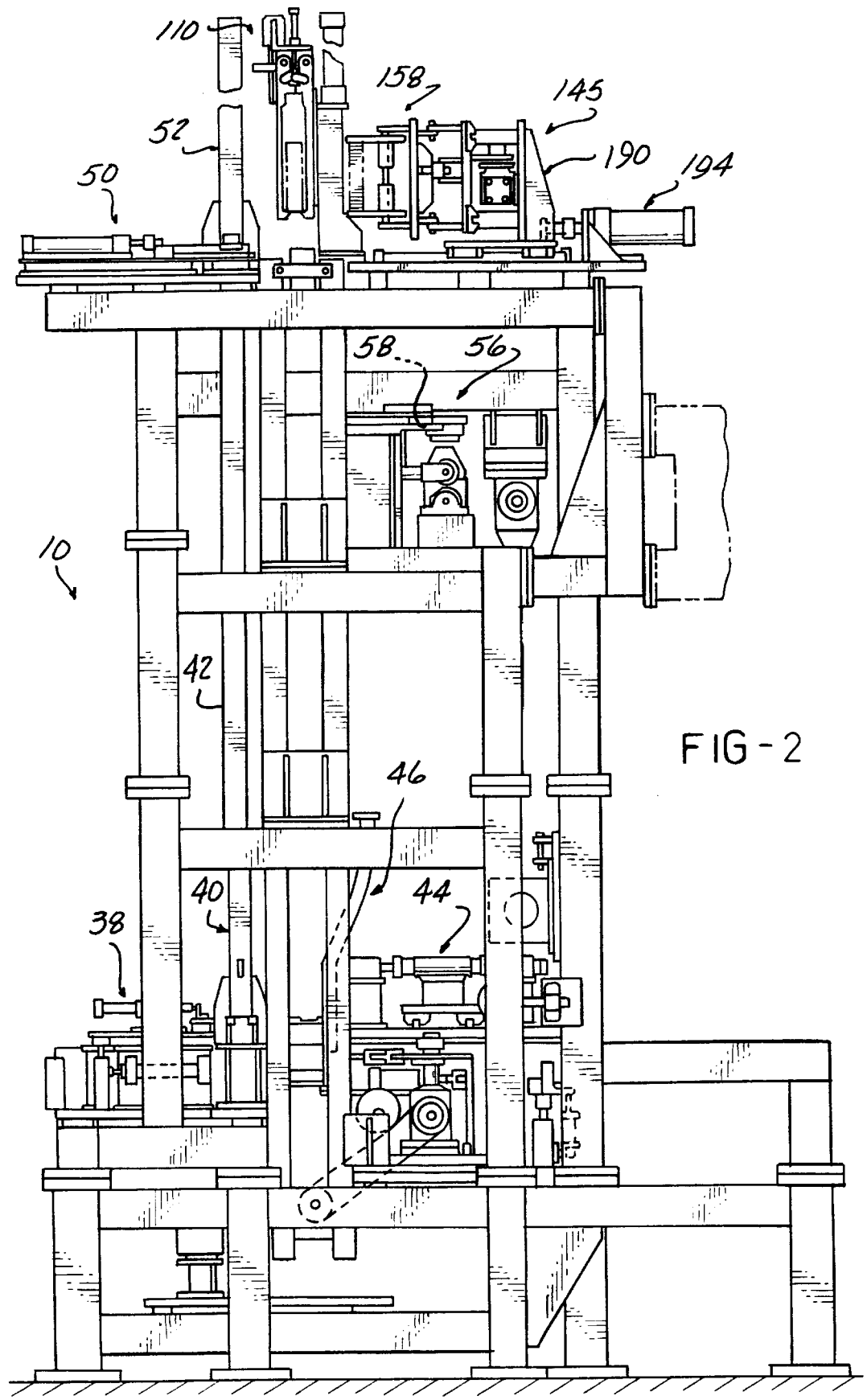
FIG. 2 is a side elevational view of the apparatus depicted in FIG. 1.

An apparatus 10 according to the present invention is illustrated in a front elevational view in FIG. 1 and a right side elevational view in FIG. 2. The apparatus 10 is for assembling a heat exchanger core 12 having first and second side plates 14 (best seen in FIGS. 3, 14, 15, 17 and 18) cooperating with first and second end plates 16 (best seen in FIG. 18) to sandwich a plurality of layered tubes 18 (best seen in FIGS. 10–12) and fin plates 20 (best seen FIGS. 5–9). The apparatus 10 according to the present invention includes vertical lifting means 22 for vertically stacking the tubes 18 and the fin plates 20 with respect to one another to define a layered stack 24 (shown in phantom) having opposite sides and opposite ends. Side plate assembling means 26 is provided for associating the first and second side plates 14 on opposite sides of the layered stack 24. End plate assembling means 28 is provided for associating first and second end plates 16 on opposite ends of the layered stack 24.

Figure 9:
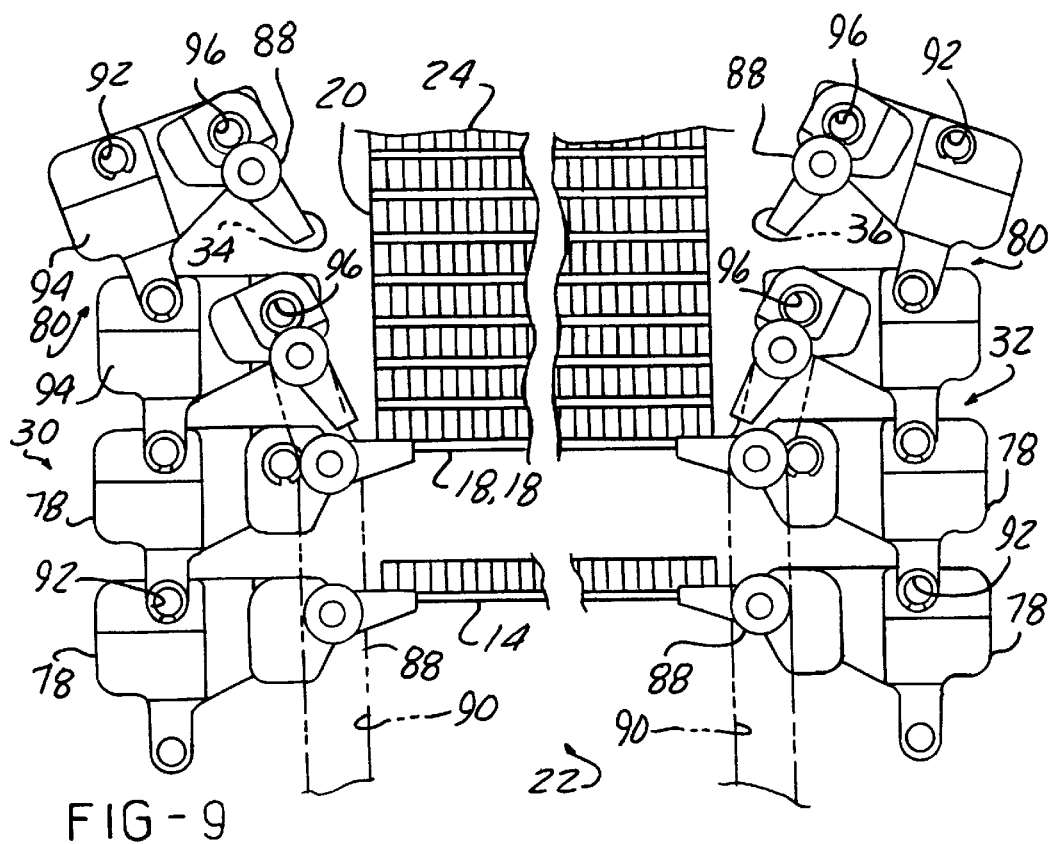
FIG. 9 is a front elevational view of lifting means according to the present invention including a plurality of links assembled into continuous first and second endless chain conveyers, where each link has at least one part-engaging support surface and a roller engagable with a cam surface for moving the part-engaging surface from an extended position to a retracted position.

As best seen in FIG. 9, the vertical lift means 22 can include first and second endless conveyors, 30 and 32 respectively, having first and second part-engaging surfaces 34 and 36 respectively. The first conveyor 30 rotates in an opposite direction from the second conveyor 32 so that parts carried by the first and second part-engaging surfaces, 34 and 36 respectively, move from a first position to a second position along a fixed path of travel during assembly.

A first-side-plate-loading station 38 is disposed on the fixed path between the first and second positions, as best seen in FIGS. 1–4. The first-side-plate-loading station 38 includes a source 40 of side plates 14, preferably disposed in a stacked, parallel relationship to one another. The source 40 of side plates 14 can include a generally vertically extending supply housing 42 for receiving and holding a plurality of side plates 14 for loading on the vertical lifting means 22. A tube-loading station 44 is disposed on the fixed path between the first and second position, and preferably between the first-side-plate-loading station 38 and the second position on the fixed path. The tube-loading station 44 preferably includes a source 46 of tubes 18. Preferably the source 46 of tubes 18 includes a generally vertically extending supply housing for receiving and holding a plurality of tubes 18 in stacked, parallel relationship to one another for loading onto the vertical lifting means 22. A second-side-plate-loading station 50 is disposed on the fixed path adjacent the second position as best seen in FIGS. 1 and 2. The second-side-plate-loading station 50 includes a source 52 of side plates 14. Preferably, the source 52 of side plates 14 includes a generally vertically extending supply housing 54 for receiving and holding a plurality of side plates 14 in stacked, parallel relationship to one another for loading adjacent the second end of the fixed path during assembly of the layered stack 24. A fin-plate-loading station 56 is disposed on the fixed path between the first and second positions, and preferably between the tube-loading station 44 and the second-side-plate-loading station 50. The fin-plate-loading station 56 includes a source 58 of fin plates 20 best seen in FIGS. 5–8. Preferably, the source 58 of fin plates 20 includes a generally horizontally extending supply conveyor 60. The supply conveyor 60 preferably receives and holds a plurality of fin plates 20 in generally coplanar, parallel relationship with respect to one another, and supplies a biasing force in the fin-plate-loading direction as the conveyor travels beneath the horizontally stacked plurality of fin plates 20 disposed on the supply conveyor 60.

Figure 3:
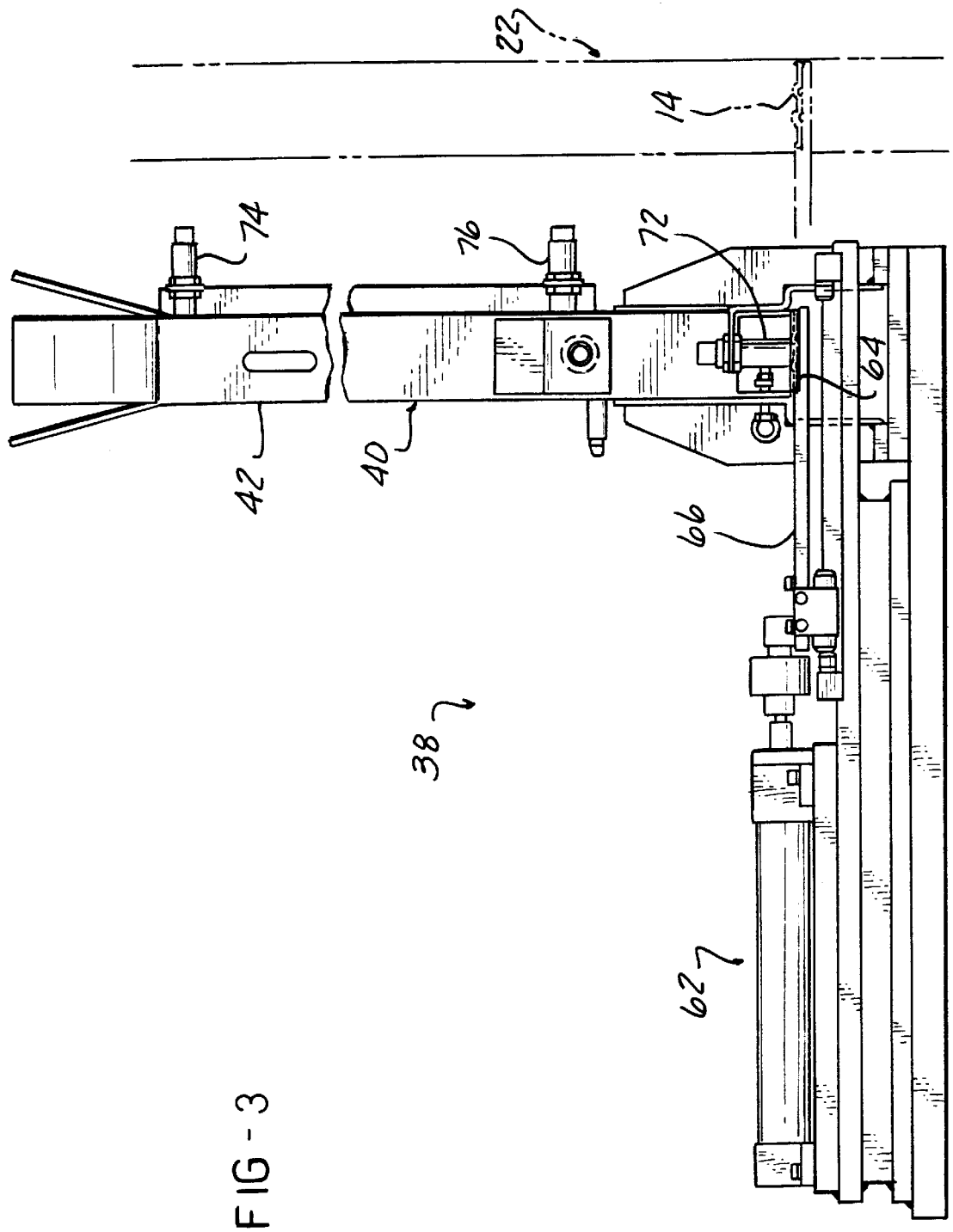
FIG. 3 is a side elevational view of a first-side-plate-loading station according to the present invention.
Figure 4:
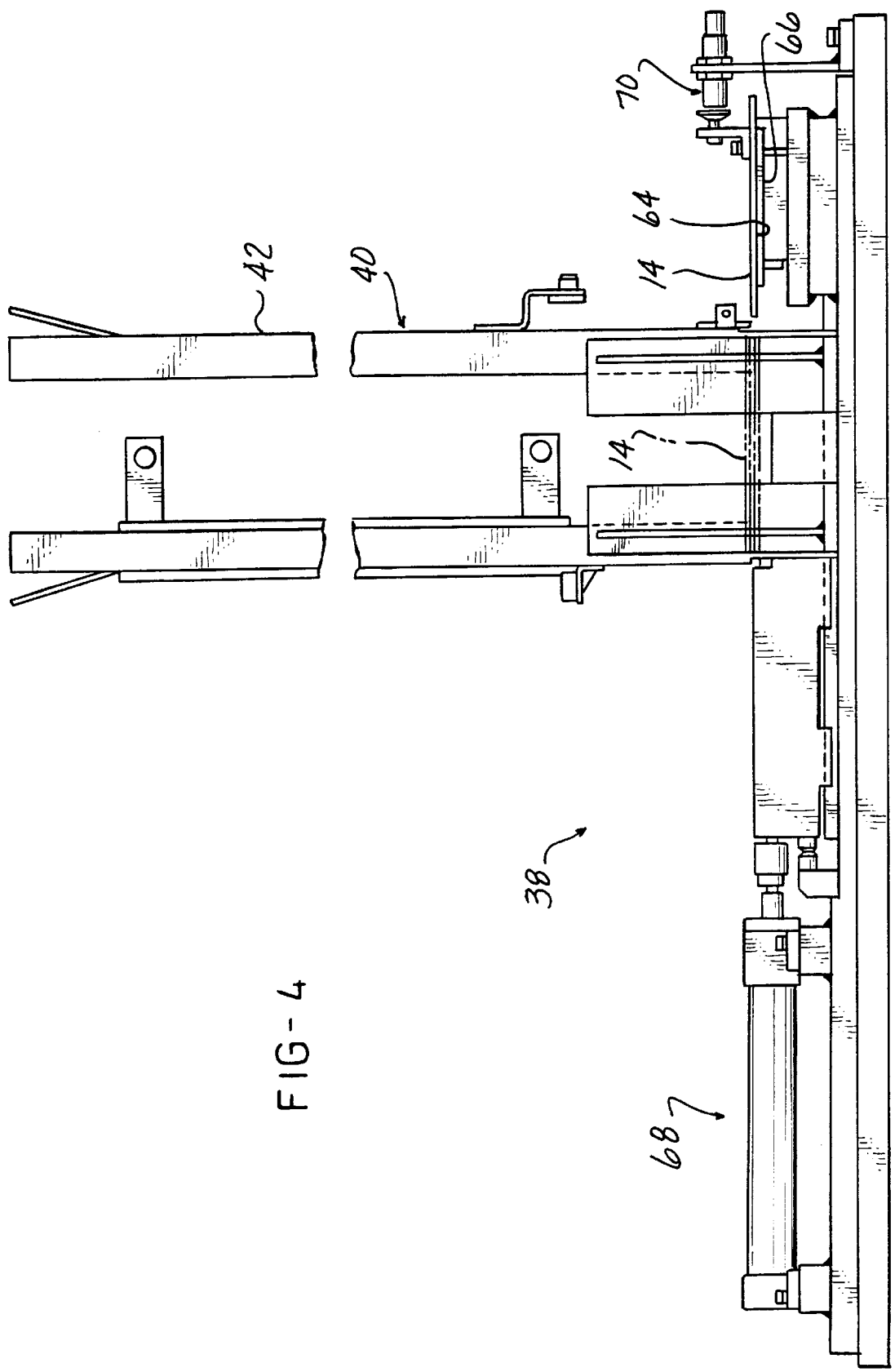
FIG. 4 is rear elevational view of the first-side-plate-loading station illustrated in FIG. 3.

Referring now to FIGS. 3 and 4, the first-side-plate-loading station 38 will be described in detail. The first-side-plate-loading station 38 is similar in construction and operation to the second-side-plate-loading station 50 and the tube-loading station 44, and the following description is to be considered generic with respect to the various side-plate and tube loading stations except for the differences as noted below. In FIG. 3, a source 40 or 42 of side-plates 14 is illustrated. Reciprocal means 62 is provided for driving a single side plate 14 in movement between a first position and a second position. In the first position, illustrated in solid lines, the side plate 14 is loaded into a corresponding slot 64 formed in a part carrying member 66. The part carrying member 66 is movable to a second position, illustrated in phantom, within the vertically extending fixed path of the vertical lifting means 22 as will be described in greater detail below. While in the fixed path of the vertical lifting means 22, opposite ends of the side plate 14 are engaged and the side plate 14 is lifted from the slot 64 of the part carrying member 66. The part carrying member 66 is then returned to the first position by the reciprocal means 62. As best seen in FIG. 4, when in the first position, a second reciprocal means 68 is provided for removing a lower-most side plate 14 from the vertically extending supply housing 40 or 42 to deposit the lower-most side plate in the slot 64 of the part carrying member 66. Sensor means 70 is provided for determining when the part carrying member 66 is in the first position. As best seen in FIG. 3, second sensor means 72 can be provided for determining when the side plate 14 is positioned within the slot 64 of the part carrying member 66. Furthermore, sensors 74 and 76 can be provided for determining when the supply housing 40 or 42 is completely full, or in need of replenishment. With reference to the tube-loading station 44, the part carrying member 66 includes first and second parallel slots 64 (not shown) for loading first and second tubes 18 onto the vertical lifting means 22 as can best be seen in FIGS. 10–12.

Figure 19:
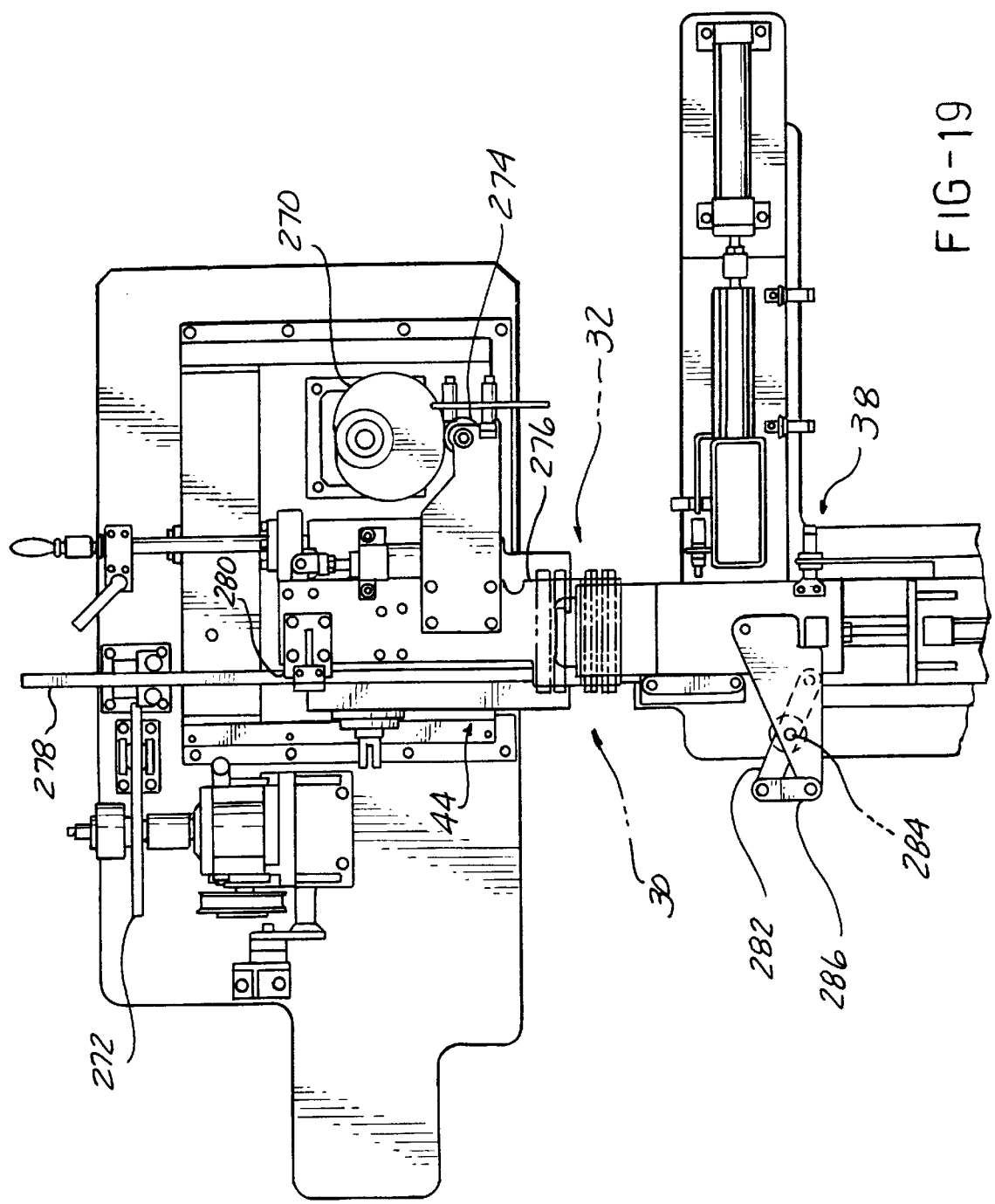
FIG. 19 is a plan view of the apparatus for assembling a heat exchanger core illustrating a synchronized connection between the tube loading station and the first-side-plate-loading station.

Referring now to FIG. 19, the best mode for driving the tube loading station in synchronized movement with the first-side-plate-loading station is illustrated in plan view. A common drive motor (not shown) is connected to the first and second conveyors 30 and 32, a first rotatable cam surface 270 and a second rotatable cam 272. The first rotatable cam surface 270 engages a cam follower 274 for driving the tube-part-carrying member 276 in reciprocation between first and second end limits of travel, where the tube-part-carrying member 276 is withdrawn from the fixed path of travel for the vertical lifting means 22 when in the first position and is positioned within the vertically extending fixed path of the vertical lifting means 22 when in the second position. The tube-part-carrying member 276 reciprocates between the first and second positions for each link or pair of opposing first and second part engaging surfaces 34 and 36 (as seen in FIG. 9) carrying tubes to be received and carried by the vertical lifting means 22, except for every nineteenth reciprocation, when the source of tubes is held up from loading the vertical lifting means 22. The location corresponding to the nineteenth reciprocation is an empty slot or position for the first-side-plate-loading station to fill. For the other eighteen cycles, the tube-part-carrying member 276 is loaded with two tubes in first and second parallel slots on the return movement from the second position to the first position for subsequent loading onto the vertical lifting means 22 in response to the next movement to the second position. The movement of the first-side-plate-loading station and the temporary termination of the tube loading function during the nineteenth cycle is coordinated and controlled by the second rotatable cam surface 272. The second rotatable cam surface 272 is driven with a nineteen to one (19:1) reduction, so that one complete rotation of second cam surface 272 occurs for every nineteenth rotation of the first cam surface 270. A sensor located with respect to the second cam surface 272 signals the completion of eighteen cycles of loading tubes onto the vertical lifting means 22. In response to the signal, a solenoid actuates to temporarily prevent loading of additional tubes into the tube-part-carrying member 276 as it returns from the second position to the first position. The next cycle of the tube-part-carrying member 276 positions an empty tube part carrying member 276 with respect to the vertical path of the lifting means 22, thereby leaving an open space. The solenoid is then deactivated to allow loading of tubes into the tube-part-carrying member 276 as it returns to the first position. The operation of the second rotatable cam surface 272 is coordinated to operate a lever to lift a drive bar 278 from a first position to a second position. When in the first position, the drive bar 278 is disengaged from the reciprocating movement of the tube-part-carrying member 276 as it is driven by the cam follower 274 engaging with the first rotatable cam surface 270. When in the second position, the drive bar 278 is coupled with the tube part carrying member 276 so that it is driven in reciprocation in response to the cam follower 274 engaging with the first rotatable cam surface 270. The drive bar 278 is coupled to the tube-part-carrying member 276 through coupling member 280 when in the second position. An opposite end of the drive bar 278 is engaged to one end of rotatable drive arm 282. The rotatable drive arm 282 rotates about pivot axis 284, and a diametrically opposite end of the drive arm 282 is connected through link 286 to drive the first-side-plate part carrying member 66 in reciprocation between first and second end limits of travel as previously described. The drive bar 278, coupling member 280, drive arm 282 and link 286 define the reciprocal means 62. In this fashion, the movement of the tube loading station 44 is synchronized, so that three cycles after leaving an open slot, movement of the first-side-plate-loading station 38 is actuated to fill the empty slot with a side plate 14 loaded from the opposite side of the vertical lifting means 22 with respect to the tube-loading station 44. As the tube part carrying member 276 returns to the first position, the drive bar 278 moves the first-side-plate part carrying member 66 back to the first position. Biasing means are provided for normally urging the tube part carrying member 276 toward the first position to maintain the cam follower 274 in contact with the first rotatable cam surface 270. After actuation of the first-side-plate-loading station 38 and return of the first-side-plate part carrying member 66 to the first position, the drive bar 278 is returned to the first position in response to further movement of the second rotatable cam surface 272 thereby disengaging the coupling member 280 allowing the tube-part-carrying member 276 to be driven through eighteen cycles between the first and second positions before being reconnected through coupling member 280 to the drive bar 278 in response to movement of the drive part 278 from the first position to the second position in response to movement of the second rotatable cam surface 272.

Figure 10:
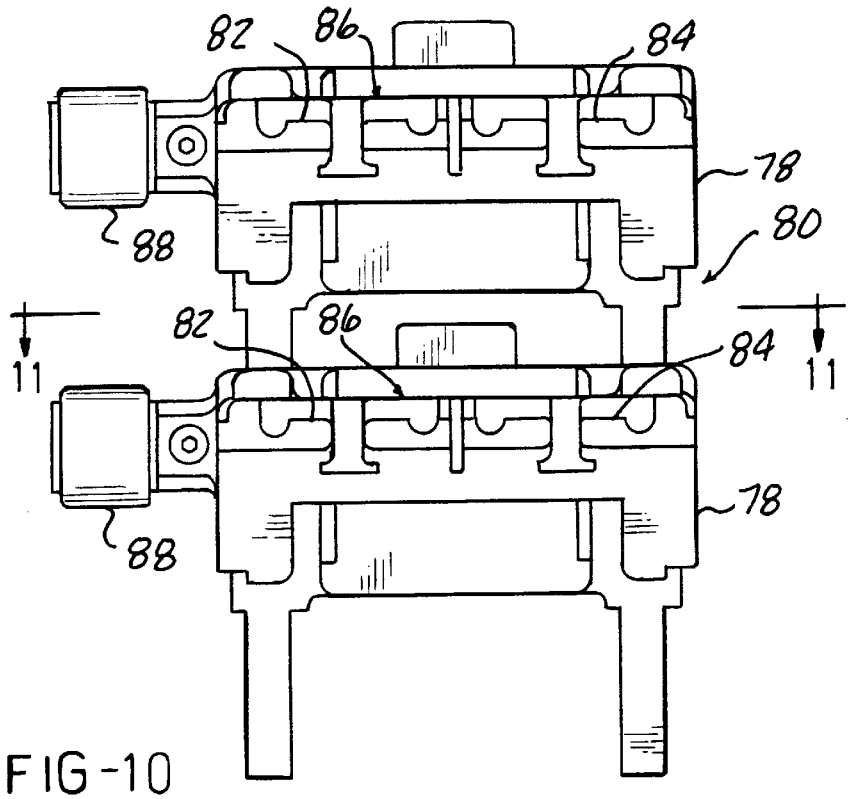
FIG. 10 is a side elevational view of two connected links according to the present invention.
Figure 11:
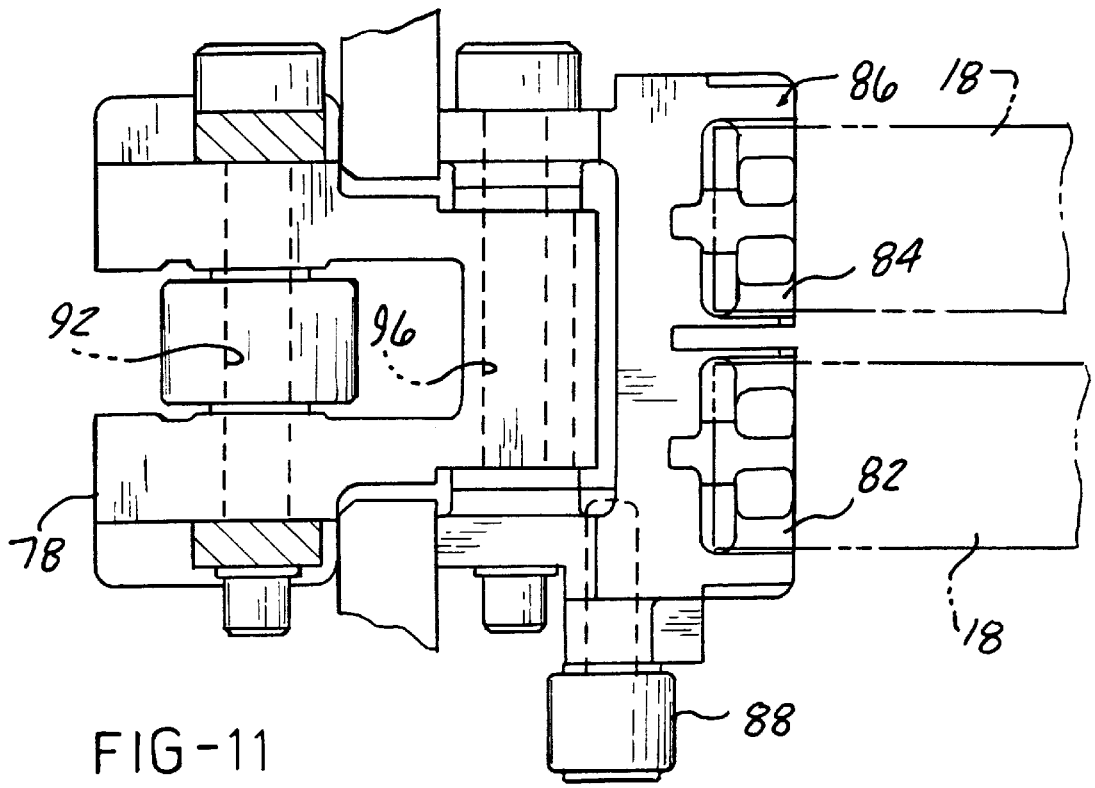
FIG. 11 is a plan view of the assembled link taken in cross section taken as shown in FIG. 10.
Figure 12:
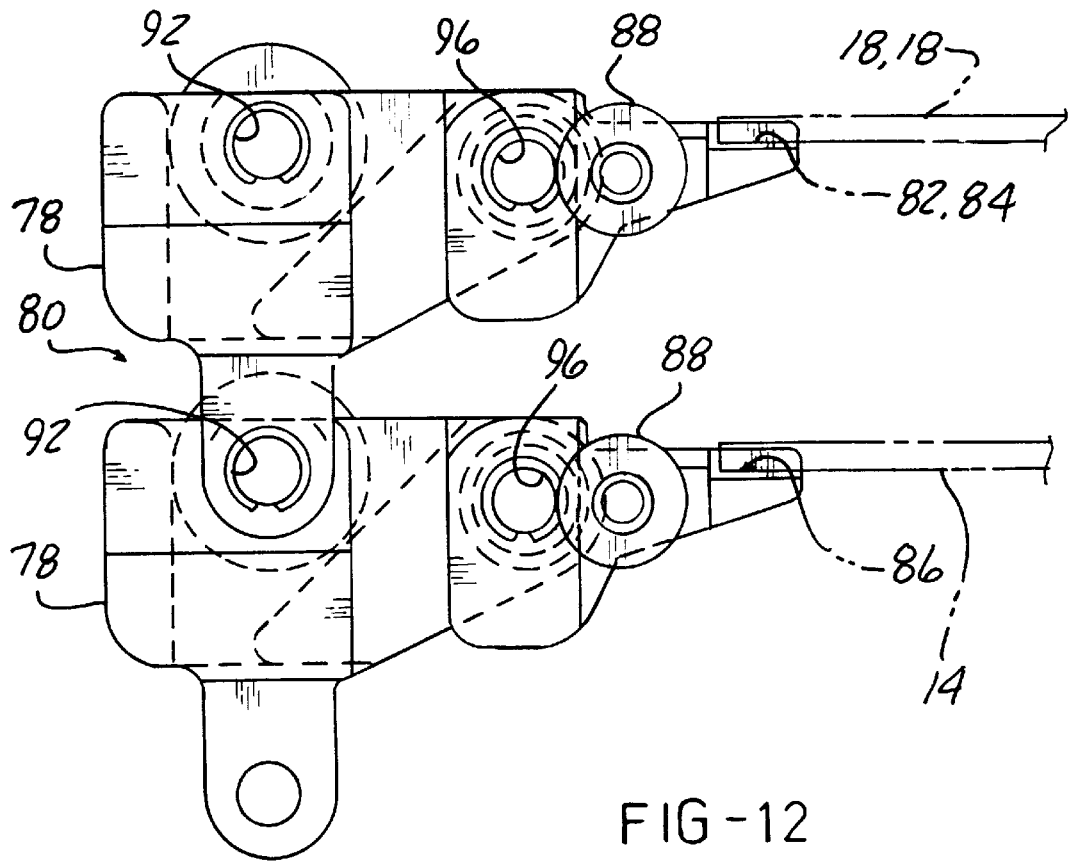
FIG. 12 is a front elevational view of the two links illustrated in FIG. 10.

Referring now to FIGS. 10–12, the first and second conveyors 30 and 32 preferably include a plurality of links 78 assembled in a continuous chain 80. Each link 78 has at least one part-engaging surface 34 or 36. Each part-engaging surface 34 or 36 includes first and second tube-receiving apertures 82 and 84. Each link 78 also includes an upper surface 86 adapted to support either a side plate 14 or two tubes 18 disposed parallel to one another. Each link 78 also includes a roller 88 engageable with a cam surface 90 (best seen in FIG. 9) for moving the part-engaging surface 34 or 36 from an extended position to a retracted position as best seen in FIG. 9. As best seen in FIGS. 11 and 12, each link 78 is connected to an adjacent link by a first pivot pin 92. The part-engaging surface 34 or 36 and roller 88 are pivotly connected with respect to a main body 94 of each link 78 by a second pivot pin 96. As best seen in FIG. 9, as the layered stack 24 approaches the second position along the fixed path of the vertical lifting means 22, the rollers 88 engage within a slot defining the cam surface 90 to move the part-engaging surface 34 or 36 downwardly and away from the layered stack 24 of tubes 18 and fin plates 20. When a first side plate 14 is carried vertically along the fixed path of the vertical lifting means 22 to the bottom of the layered stack 24, the layered stack 24 is complete with respect to the stacking process that takes place during the movement along the fixed path of the vertical lifting means 22. The number of sandwiched or interposed tubes 18 and fin plates 20 disposed between the first and second side plates 14 can be varied depending on the size and shape of the desired heat exchanger core 12. By way of example and not limitation, a first side plate 14 can be disposed on every nineteenth part-engaging surface 34 and 36 of the first and second endless conveyors 30 and 32.

Figure 5:
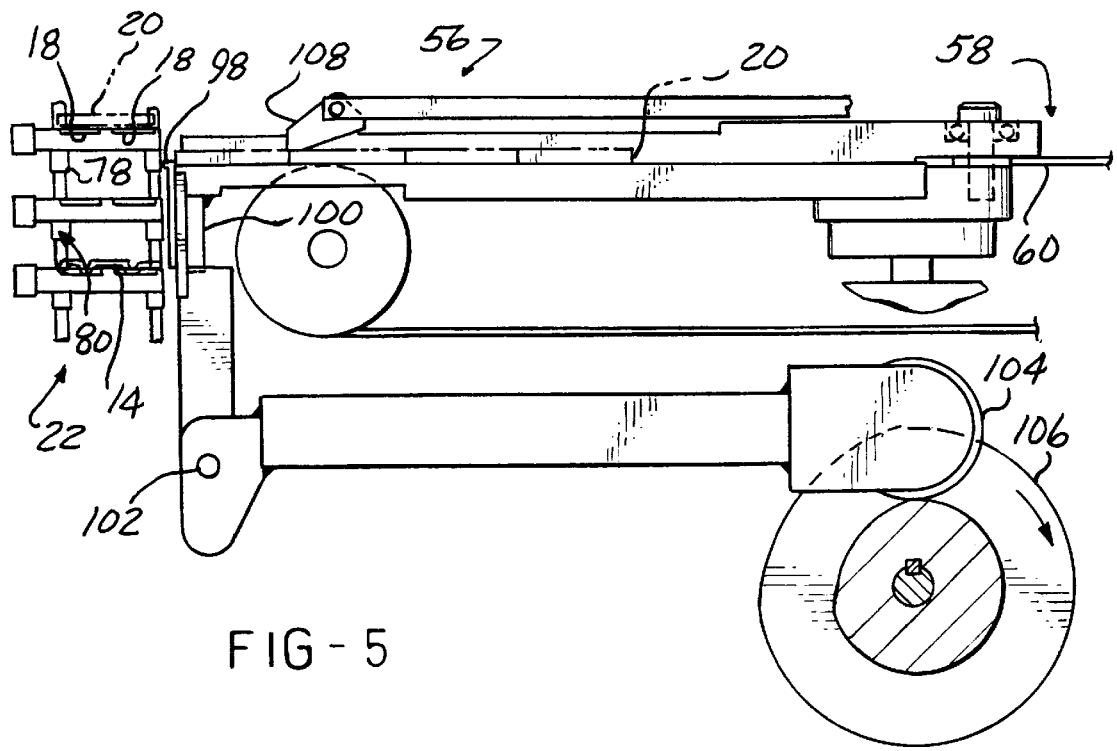
FIG. 5 is a side elevational view of a fin-plate-loading station in a first position according to the present invention.
Figure 6:
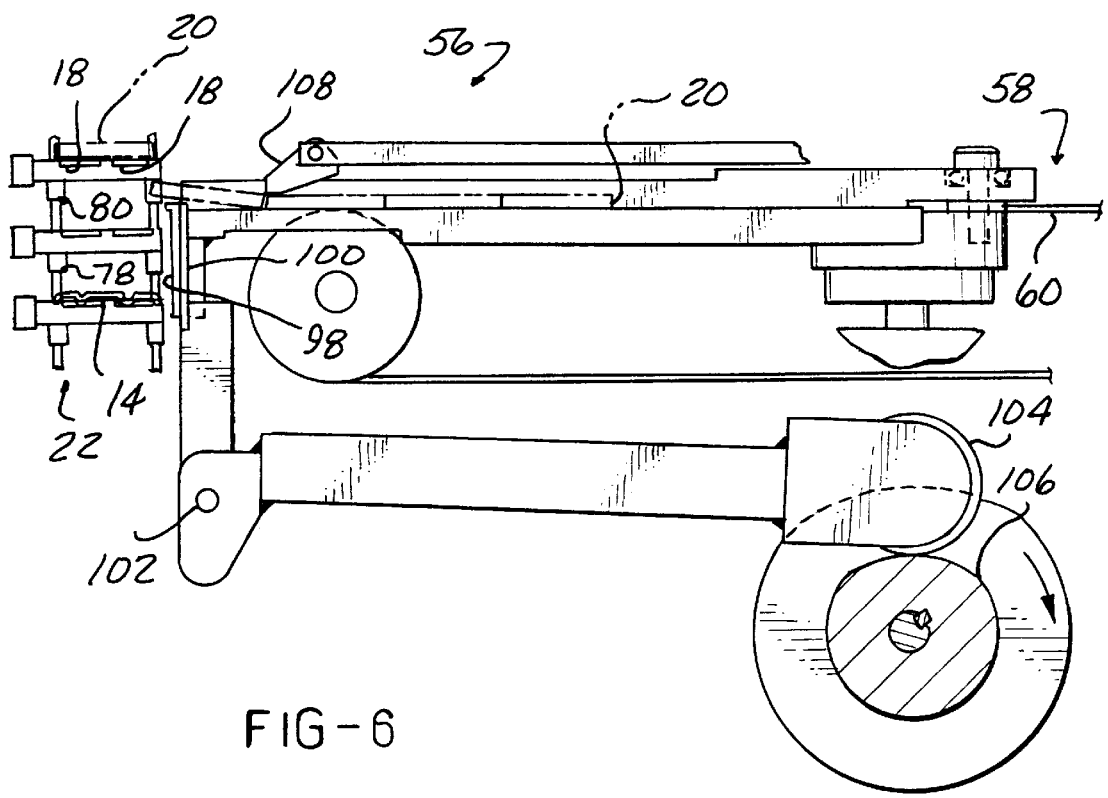
FIG. 6 is a side elevational view of the fin-plate-loading station of FIG. 5 after moving to a second position.
Figure 7:
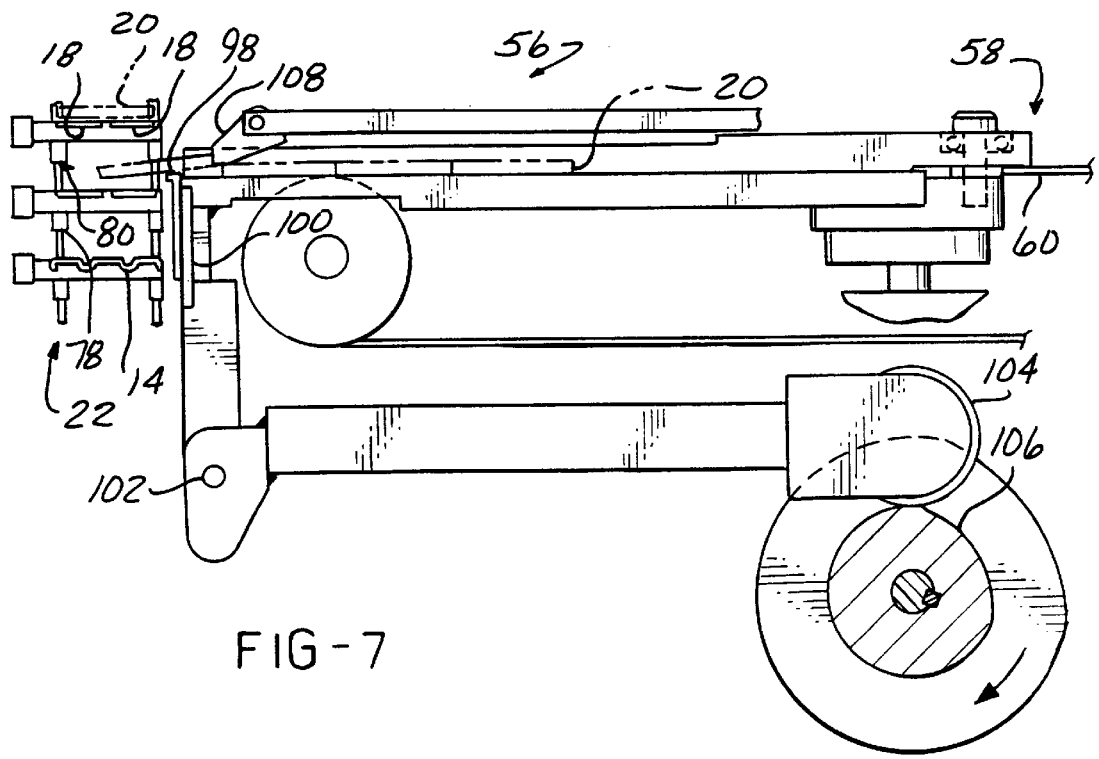
FIG. 7 is the fin-plate-loading station of FIG. 6 after moving to a third position.
Figure 8:
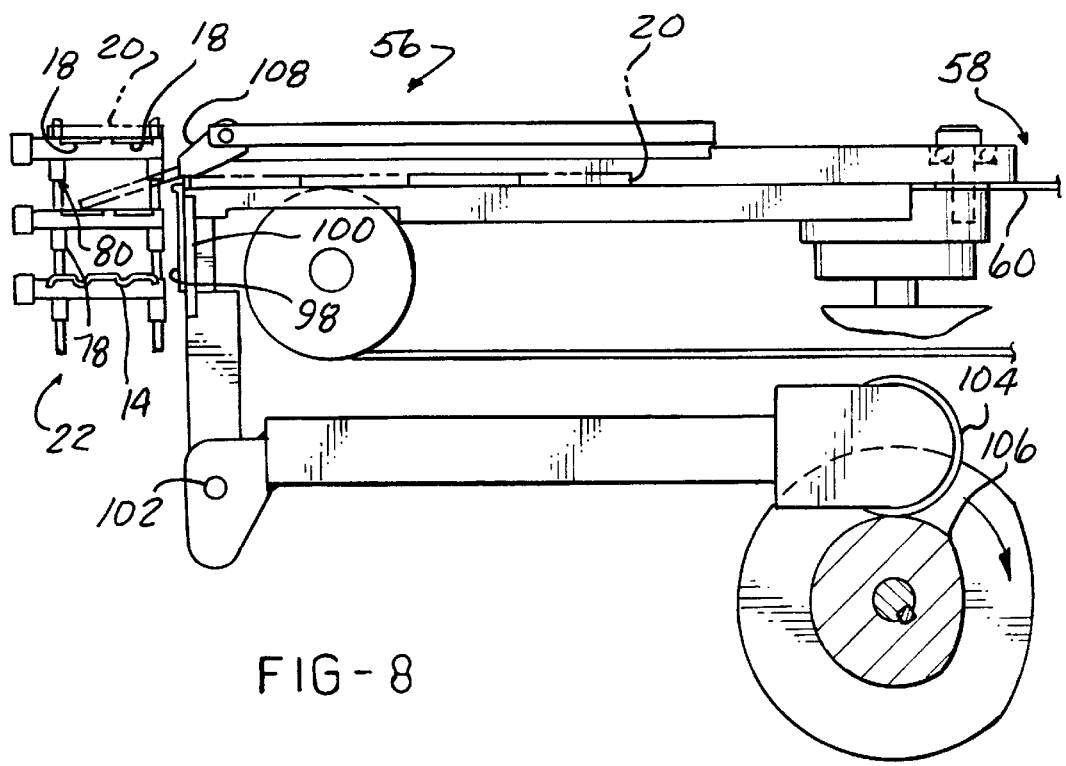
FIG. 8 is the fin-plate-loading station of FIG. 7 after having moved to a fourth position prior to returning to the first position of FIG. 5.

Referring now to FIGS. 5–8, the fin-plate-loading station 56 is described in greater detail. The generally horizontally extending supply conveyor 60 holds a plurality of fin plates 20, preferably in a coplanar, parallel relationship with respect to one another. Constant motion of the supply conveyor 60 in the unloading direction imparts a biasing force to the plurality of fin plates 20. The plurality of fin plates 20 are held in position by stationary wall 98 as shown in FIG. 5. The loading of the fin plate 20 closest to the vertical lifting means 22 progresses sequentially as shown in FIGS. 6–8. A reciprocating knife edge 100 engages a forward portion of the forward-most fin plate 20 to raise the forward-most lower edge of the fin plate 20 above the stationary wall 98. The biasing force of the remaining fin plates 20, imparted by the continuously rotating endless supply conveyor 60, drives the forward-most fin plate 20 forward into the fixed path of travel of the vertical lifting means 22. The reciprocating knife edge 100 is driven in motion about pivot pin 102 in response to a cam follower 104 engaging with a rotating cam surface 106, or by any other suitable means of reciprocation. Preferably, the motion of a retaining finger 108 is coordinated with the rotation of the cam surface 106 to provide the sequenced reciprocating finger 108 and knife edge 100 motion as depicted in FIGS. 5–8. As best seen in FIG. 6, the retaining finger 108 maintains downward pressure on the next forward-most fin 20 as it approaches the stationary wall 98 as seen in FIGS. 7–8. In addition, the retaining finger 108 eventually engages the rear-most edge of the forward-most fin plate 20 to ensure that the fin plate 20 is driven into the desired position with respect to the vertical lifting means 22. A deflection plate (not shown) can be positioned opposite from the retaining finger 108 to ensure that the fin plate 20 does not overshoot the desired position with respect to the vertical lifting means 22. The retaining finger 108 continues to move to the left as illustrated in FIG. 8 until the fin plate 20 is properly positioned in the path of travel of the vertical lifting means 22, which is slightly further to the left than that illustrated in FIG. 8. This position also ensures that the fin plate 20 does not rebound off from the deflection plate to an improper position. After properly positioning the fin plate 20 in the path of travel of the vertical lifting means 22, the retaining finger 108 returns to the original position as illustrated in FIG. 5. During this time, the reciprocating knife edge 100 has been returned to the retracted position as illustrated in FIG. 7, and remains in that position until the appropriate time to load the next fin plate 20 into the path of travel of the vertical lifting means 22. The fin plates 20 are loaded and supported on top of the tubes 18, or the side plate 14 as the tubes 18 or side plates 14 are carried along the path of travel by the chain 80 of interconnected links 78. Preferably, the sequenced motion of the knife edge 100 and retaining finger 108 can be provided by interconnecting the drive motor (not shown) of the cam surface 106 and retaining finger 108. Appropriate sensors (not shown) can be positioned along the supply conveyor 60 for signaling control means (not shown) to indicate if the source 58 of fin plates 20 is completely full, or in need of replenishment.

Figure 14:
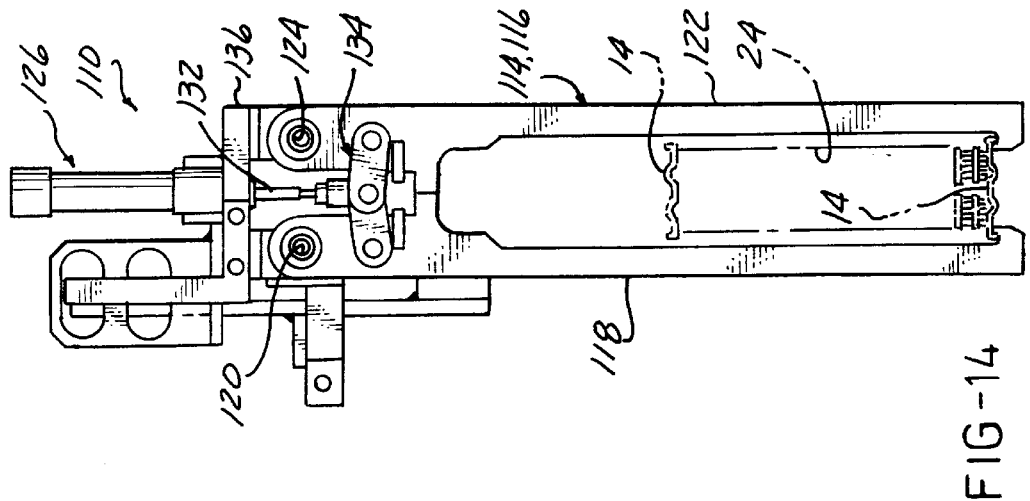
FIG. 14 is a side elevational view of the second-side-plate-loading and layered stack lifting station illustrated in FIG. 13.
Figure 13:
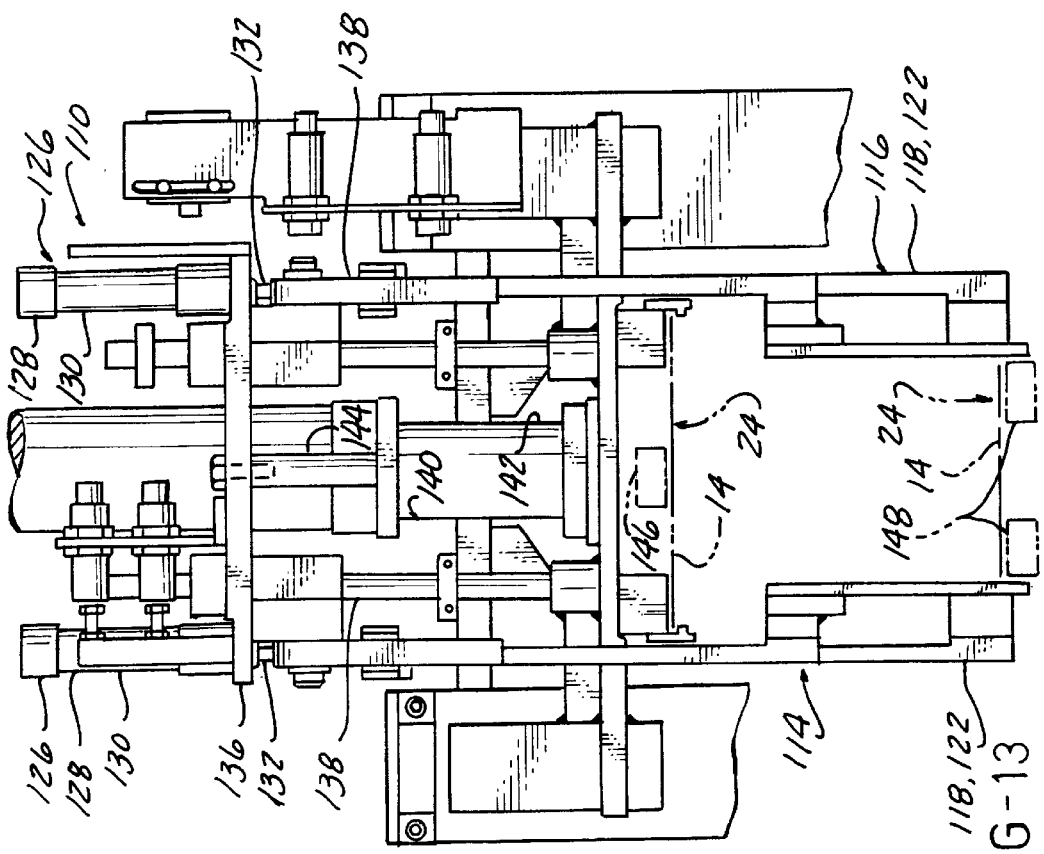
FIG. 13 is a front elevational view of a second-side-plate loading and layered stack lift station according to the present invention.

Referring now to FIG. 9, after the fin plates 20 have been loaded at the fin-plate-loading station 56, the layered stack 24 is formed adjacent the second position of the path of travel along the vertical lifting means 22. The stacking of the layered parts carried by the vertical lifting means 22 is accomplished by controlling the operation of the plurality of links 78 in each chain 80 by guiding the roller 88 with respect to a cam surface 90. As previously described, each link 78 includes a part-engaging surface, 34 or 36, independently pivotable about second pivot pin 96 in response to the roller 88 engaging with the cam surface 90. The pivoting action of the part-engaging surfaces, 34 and 36, is independent with respect to the main body 94 of each link 78. Adjacent main bodies 94 are connected to one another through first pivot pins 92 to form an endless chain 80 defining the first and second endless conveyors 30 and 32. The movement of the part-engaging surfaces, 34 and 36, are coordinated to place the upper portion of the layered stack 24 on the lower-most parts supported by the vertical lifting means 22 so that the layered stack 24 is progressively built up in a sandwiched or interposed fashion alternating between fin plates 20 and tubes 18 until the lower-most supporting part corresponds to one of the side plates 14. At this point, the completed layered stack 24 is engaged and lifted by lift means 110 at a layered stack lift station 112 to remove the completed layered stack 24 from the vertical lifting means 22 as best seen in FIGS. 13 and 14. The first and second endless conveyors 30 and 32 continue to rotate in opposite directions building another layered stack 24 as the completed layered stack 24 is lifted and transferred as will be described in greater detail below.

Referring now to FIGS. 13 and 14, the lift means 110 includes first and second pairs of arms, 114 and 116 respectively, pivotally connected to opposite sides of the lift means 110. Each of the first and second pairs of arms, 114 and 116 respectively, includes a first arm 118 pivotally connected to the lift means 110 such as through pivot pin 120, and a second arm 122 pivotally connected to the lift means 110, such as by a second pivot pin 124. The first arm 118 and second arm 122 are movable with respect to one another between a first engaged position as illustrated in FIG. 14, where the ends of the first and second arms, 118 and 122 of the first and second pairs of arms 114 and 116, engage the lower side plate 14 for lifting the layered stack 24 from the vertical lifting means 22 after the matrix of interposed tubes 18 and fin plates 20 has been built up or stacked, and a second disengaged position (not shown) where the ends of the first and second arms, 118 and 122 are pivoted outwardly away from one another to clear the layered stack 24 during the building or layering process. Drive means 126 can be provided for moving the first arm 118 and the second arm 122 with respect to one another about the first pivot pin 120 and second pivot pin 124. The drive means 126 can include any suitable drive mechanism, such as a reciprocal actuator 128 defined by a cylinder 130 housing a piston and connected rod 132 extending outwardly from the cylinder 130 for engagement through appropriate connectors or linkages 134 in order to drive the first arm 118 and second arm 122 in movement about the respective first pivot pin 120 and second pivot pin 124 in response to movement of the connected rod 132 and piston within the cylinder 130 of the reciprocal actuator 128. The lift means 110 can also include a first frame portion 136 supporting the first and second pairs of arms, 114 and 116 respectively. The first frame portion 136 is preferably movable between a first position adjacent an end of the first and second endless conveyors, 30 and 32 respectively (not shown) and a second position illustrated in FIGS. 13 and 14 spaced from the end of the first and second endless conveyors, 30 and 32. The first frame portion 136 of the lift means 110 is guided in movement between the first and second positions by at least one guide member 138. Actuator means 140 is provided for driving the first frame portion 136 between the first and second positions. The actuator means 140 can include a cylinder 142 housing a piston and connected rod 144 extending outwardly from the cylinder 142 for connection to the first frame portion 136. Appropriate sensors can be provided for generating signals indicating if the first frame portion 136 is in the first or second position, and indicating if the first and second pairs of arms, 114 and 116 respectively, are in the first or second position. The signals from the various sensors or sensor means described herein can be connected to control means for automatically controlling the operation of the apparatus 10 for building a heater core matrix.

In operation, the lift means 110 can be initially positioned adjacent the end of the first and second endless conveyors 30 and 32 respectively with the first and second pairs of arms 114 and 116 in the open or disengaged position. While in this position at the second-side-plate-loading station 50, the second side plate 14 is loaded on to the top of the heater core matrix being built up in a layered stack at the end of the first and second endless conveyors 30 and 32 respectively. When the layered stack 24 is completed, the first or lower side plate 14 is disposed at the bottom of the layered stack 24. The first and second pairs of arms 114 and 116 respectively are actuated to engage the first side plate 14 with the ends of each of the first and second arms, 118 and 122 respectively. While in the engaged position with the ends of the first and second arms 118 and 122 supporting the lower side plate 14, the first frame portion 136 is moved from the first position to the second position to lift the matrix or layered stack 24 from the vertical lifting means 22.

Figure 15:
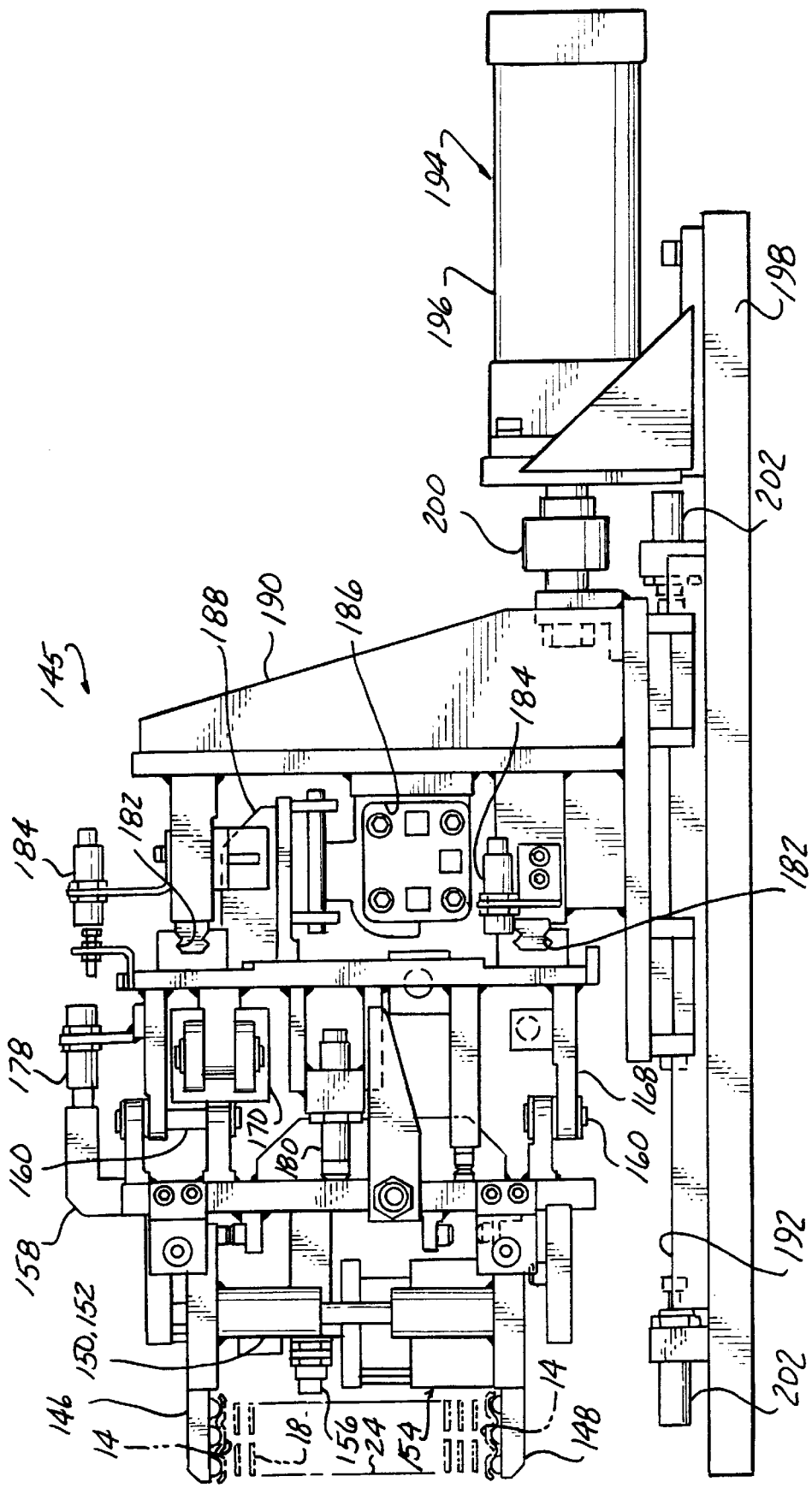
FIG. 15 is a side elevational view of carrier means according to the present invention for transporting the layered stack along a fixed transfer path from a lift-means-unloading position to a transfer position.
Figure 16:
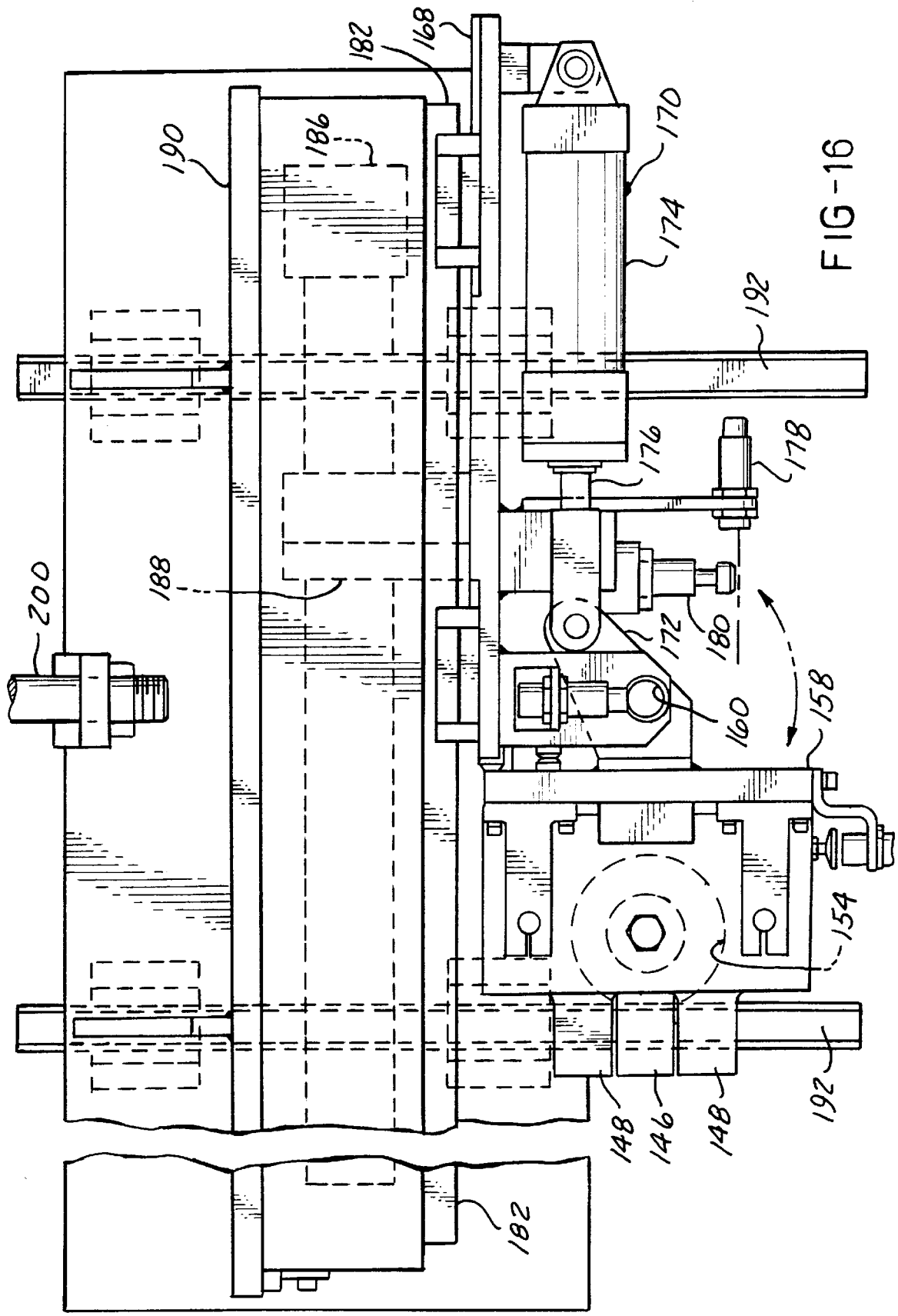
FIG. 16 is a plan view of the carrier means illustrated in FIG. 15.

When in the second position, the layered stack 24 is engaged by opposing first and second grippers 146 and 148 of an overhead matrix unloading assembly 145 illustrated in FIGS. 15 and 16 to remove the completed matrix or layered stack 24 from the matrix lifter assembly 110 illustrated in FIGS. 13 and 14 at the end of the heater core matrix builder 22 as best seen in FIG. 9. After the first and second grippers 146 and 148 respectively have engaged the first and second side plates 14 of the layered stack 24, the first frame portion 136 is moved by the actuator means 140 to an intermediate position between the first and second end limits of movement to allow the overhead matrix unloading assembly 145 to move the layered stack 24 out of the matrix lifter assembly 110 as best seen at the top of FIG. 2. Drive means 126 is then actuated to move the first and second pairs of arms 114 and 116 so that each of the first arms 118 is pivoted about the first pivot pin 120 and each of the second arms 122 is pivoted about the second pivot pin 124 into the disengaged position. The actuation of the drive means 126 to move the pairs of arms 114 and 116 to the disengaged position may also take place prior to moving from the second position to the intermediate position, if desired. After the first and second pairs of arms 114 and 116 are moved to the disengaged position, the first frame portion 136 is returned to the first position adjacent the ends of the first and second endless conveyors 30 and 32 to perform another matrix lift cycle.

Referring now to the top of FIG. 2 and FIG. 15, the overhead matrix unloading assembly 145 includes opposing first and second grippers 146 and 148 movable along first and second guide members 150 and 152 respectively between a first disengaged position (not shown) and a second engaged position as illustrated in FIG. 15, where the first and second grippers 146 and 148 engage the first and second side plates 14 of the layered stack 24 for unloading movement with the respect to the fixed path of the vertical lifting means 22. Any suitable actuator means 154 can be provided for moving the first and second grippers 146 and 148 between the disengaged and the engaged positioned. By way of example and not limitation, the actuating means 154 can include a cylinder connected to one of the first and second grippers 146 and 148 housing a piston and connected rod extending outwardly from the cylinder for connection to the other of the first and second grippers 146 and 148. A sensor 156 can be provided for indicating if a layered stack 24 is positioned between the first and second gripper 146 and 148. The first and second grippers 146 and 148 are carried on a first pivotal frame 158. The first pivotal frame 158 is movable about a vertical axis corresponding to pivot pins 160 between a first position as illustrated in the elevational views of FIGS. 2 and 15, and a second position corresponding to that of the plan view illustrated in FIG. 16. The first pivotal frame 158 rotates through approximately 90 degrees of movement in order to position the layered stack 24 for engagement by third and fourth opposing grippers 162 and 164 connected to the vertical transfer assembly or elevator means 166 illustrated in FIG. 1 and 17. This transfer will be described in greater detail below. The first pivotal frame 158 is pivotally connected to a first carriage frame 168. As best seen in FIG. 16, actuator means 170 extends between the first carriage frame 168 and an arm 172 of the first pivotal frame 158 for driving the first pivotal frame 158 in movement between the first and second angular positions. The actuator means 170 can take any suitable form. By way of example and not limitation, the actuator means 170 can include a cylinder 174 connected to the first carriage frame 168 and housing a reciprocal piston and connected rod 176 attached to the arm 172 of the first pivotal frame 158. Sensors 178 can be provided for generating a signal indicated if the first pivotal frame is in the first or second position. In addition, shock absorbing stops 180 can be provided as required for the moveable elements of the present invention.

The first carriage frame 168 is movable on at least one, and preferably two rails 182 between a first position in alignment with the lift means 110 (corresponding to the right hand portion of the plan view of FIG. 16), and a second end limit of travel (corresponding to the left hand portion of the plan view of FIG. 16). The second end limit of travel for the first carriage frame 168 is a transfer position where the layered stack 24 is transferred from the first and second grippers 146 and 148 to the third and fourth grippers 162 and 164 as will be described in greater detail below. Sensors 184 can be provided to signal when the first carriage frame 168 is in the first end limit of travel or the second end limit of travel. Drive means 186 can be provided for moving the first carriage frame 168 along the rails 182 between the first and second end limits of travel. The drive means 186 can take any appropriate form. By way of example and not limitation, the drive means 186 can include a TOL-O-MATIC band slide with a floating foot mounting and shock absorbers on both ends. The drive means 186 is connected to a drive bracket 188 connected to the first carriage frame 168. The rails 182 are supported on a first shuttle frame 190. The first shuttle frame 190 is movable on at least one and preferably two guide rails 192 extending in a direction generally perpendicular to the rails 182. The first shuttle frame 190 is moveable on the guide rails 192 between a first position placing the first and second grippers 146 and 148 in position to engage the layered stack 24 held by lift means 110, and a second position spaced from the lift means 110 permitting the first pivotal frame 158 to pivot about the pivot pins 160 and further allowing the first carriage frame 168 to move from the first end limit of travel to the second end limit of travel for engagement of the layered stack 24 carried by the first and second grippers 146 and 148 with the third and fourth grippers 162 and 164. After the layered stack 24 carried by the first and second grippers 146 and 148 has been engaged by the third and fourth grippers 162 and 164, the first and second grippers 146 and 148 are actuated by actuator means 154 to move to the disengaged position allowing the empty first and second grippers 146 and 148 to be returned with the first carriage frame 168 from the second end limit of travel to the first end limit of travel. When the empty first and second grippers 146 and 148 have been returned with the first carriage frame 168 to the first end limit of travel, the first pivotal frame 158 is rotated about pivot pins 160 to the first position illustrated in FIG. 15 to perform another overhead matrix transfer cycle. Motor means 194 is provided for driving the first shuttle frame 190 between the first and second positions. The motor means 194 may take any suitable form. By way of example and not limitation, the motor means 194 can include a cylinder 196 connected to a stationary support frame 198 and housing a reciprocal piston and connected rod 200 attached to the first shuttle frame 190 for driving the first shuttle frame 190 along the guide rails 192. Sensors 202 may be provided for signaling to control means if the first shuttle frame 190 is in the first or second position.

Figure 17:
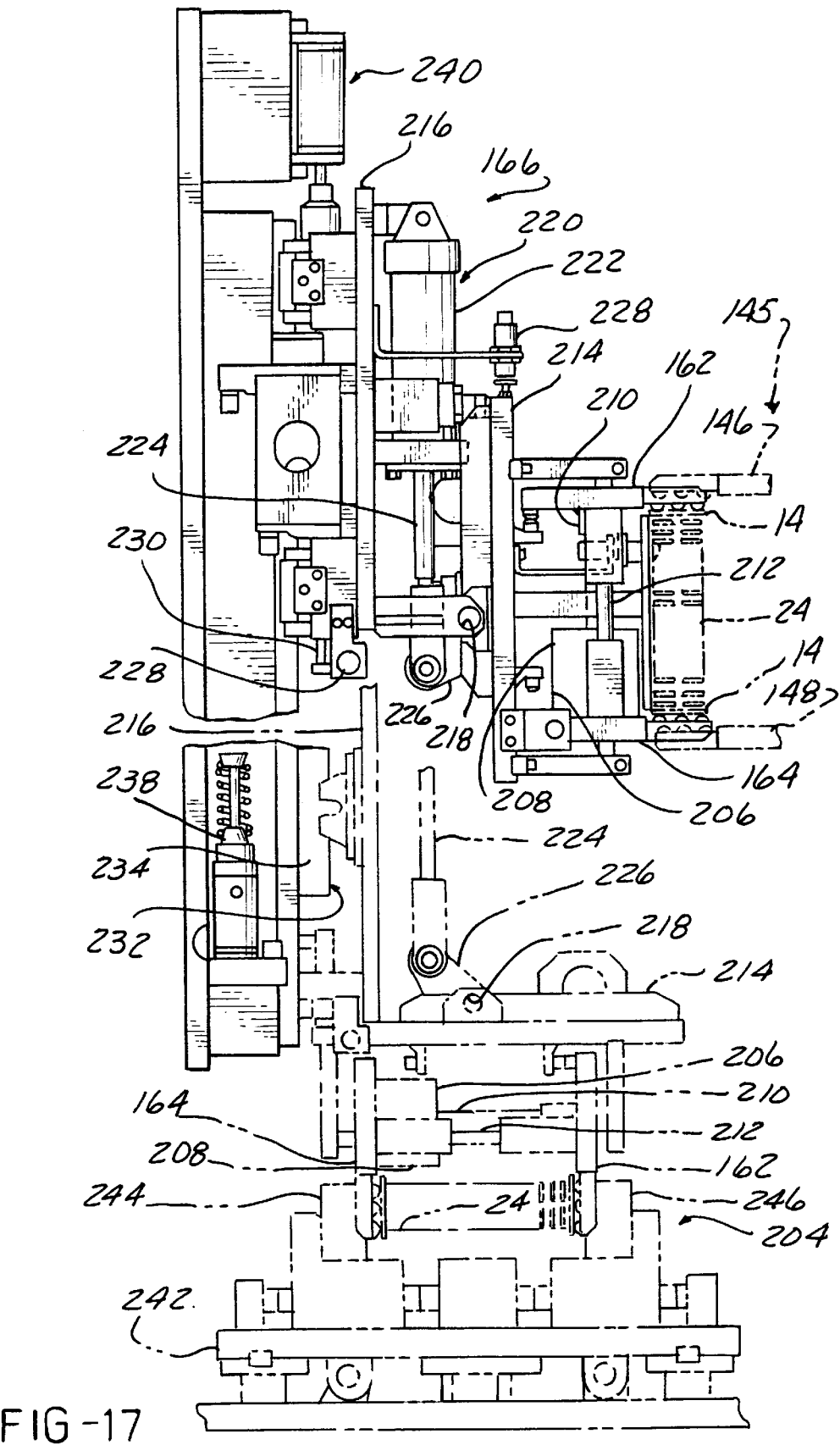
FIG. 17 is a front elevational view of elevator means according to the present invention for transporting the layered stack along a fixed path from the transfer position to a shuttle-means-loading position.

Referring to FIG. 1 and 17, the vertical transport assembly or elevator means 166 is illustrated in more detail. The vertical transport assembly 166 can be similar in construction and operation to the overhead transfer assembly 145 described above. The vertical transport assembly or elevator means 166 operates to transfer the completed layered stack 24 from the overhead transfer assembly 145 to the tube align and core compress assembly 204. The elevator means 166 can include third and fourth grippers 162 and 164 respectively opposing one another for engaging opposite sides of the layered stack 24. The third and fourth grippers 162 and 164 are movable between an engaged position for holding the layered stack 24 and a disengaged position releasing the layered stack 24 in the tube align and core compress assembly 204. Actuator means 206 is provided for moving the third and fourth grippers 162 and 164 respectively between the engaged and disengaged position. The actuator means 206 can take any suitable form. By way of example and not limitation, the actuator means 206 can include a cylinder 208 connected to one of the third and fourth grippers 162 and 164 and housing a reciprocal piston and connected rod 210 attached to the other of the third and fourth grippers 162 and 164. Guide means 212 is provided for guiding the third and fourth grippers 162 and 164 respectively between the engaged and disengaged positions when operated by the actuator means 206. The third and fourth grippers 162 and 164 are carried by a second pivotal frame 214. The second pivotal frame 214 is movable between a first position for transferring the layered stack 24 from the first and second grippers 146 and 148 of the overhead transfer assembly 145 and a second position (illustrated in phantom in FIG. 17) for depositing the layered stack 24 in the tube align and core compress assembly 204. The second pivotal frame 214 is connected to a second reciprocal carriage frame 216 by pivot pin 218 for movement between the first and second angular positions corresponding to the first transfer position for receiving the layered stack 24 from the overhead transfer assembly 145 and the second angular position corresponding to the second transfer position for depositing the layered stack 24 with respect to the tube align and core compress assembly 204. Drive means 220 is provided for moving the second pivotal frame 214 between the first and second angular orientations about the pivot pin 218. The drive means 220 can take any suitable form. By way of example and not limitation, the drive means 220 can include a cylinder 222 connected to the second reciprocal carriage frame 216 and housing a reciprocal piston and connect rod 224 attached to an arm 226 extending from the second pivotal frame 214, so that movement of the piston and connected rod 224 with respect to the cylinder 222 causes the second pivotal frame 214 to move between the first transfer position shown in solid lines adjacent the top of FIG. 17 to the second transfer position shown in phantom toward the bottom of FIG. 17. Sensors 228 can be provided for signaling if the second pivotal frame 214 is in the first angular position or the second angular position. Shock absorbing stops 230 can also be provided as required to control the movement of the second pivotal frame 214 as it approaches the first angular position and/or as it approaches the second angular position. Rail means 232 guides the second reciprocal carriage frame 216 between first and second end limits of movement. The second rail means 232 can take any desirable form and preferably includes at least one rail 234 for guiding the second reciprocal carriage frame 216 between the first and second positions. Sensors can be positioned in appropriate locations for signaling the control means to indicate if the second carriage frame 216 is in the first end limit of travel or the second end limit of travel. At least one shock absorbing stop 238 can be provided at the second end limit of travel for engaging the second carriage frame 216 as it approaches the second end limit of travel. Additional shock absorbing stops can be provided as required. In operation, the second carriage frame 216 is initially at the first end limit of travel with the second pivotal frame 214 in the first angular position and the third and fourth grippers 162, 164 in a disengaged position for receiving the layered stack 24 from the first and second grippers 146, 148. After the layered stack 24 is delivered to the transfer position, the third and fourth grippers 162, 164 engage the layered stack 24, and the first and second grippers 146, 148 release the layered stack 24. After the first and second grippers 146, 148 have moved away from the transfer position, the second pivotal frame 214 is actuated to pivot about the pivot pin 218 by drive means 220 until it reaches the second angular position. The second carriage frame 216 is driven by motor means 240 from the first end limit of travel toward the second end of travel to deposit the layered stack 24 with respect to the tube align and core compress assembly 204. The second motor means 240 can take any appropriate form. By way of example and not limitation, the second motor means 240 can include a TOL-A-MATIC band slide, similar to the first motor means 194. When at the second end limit of travel, the third and fourth grippers 162 and 164 are moved to the disengaged position to release and deposit the layered stack 24 with respect to the tube align and core compress assembly 204. The second carriage frame 216 is then driven by second motor means 240 from the second end limit of travel toward the first end limit of travel. When the second carriage frame returns to the first end limit of travel, the second pivotal frame 214 is actuated by drive means 220 to move from the second angular position to the first angular position to start another vertical transfer cycle.

Figure 18:
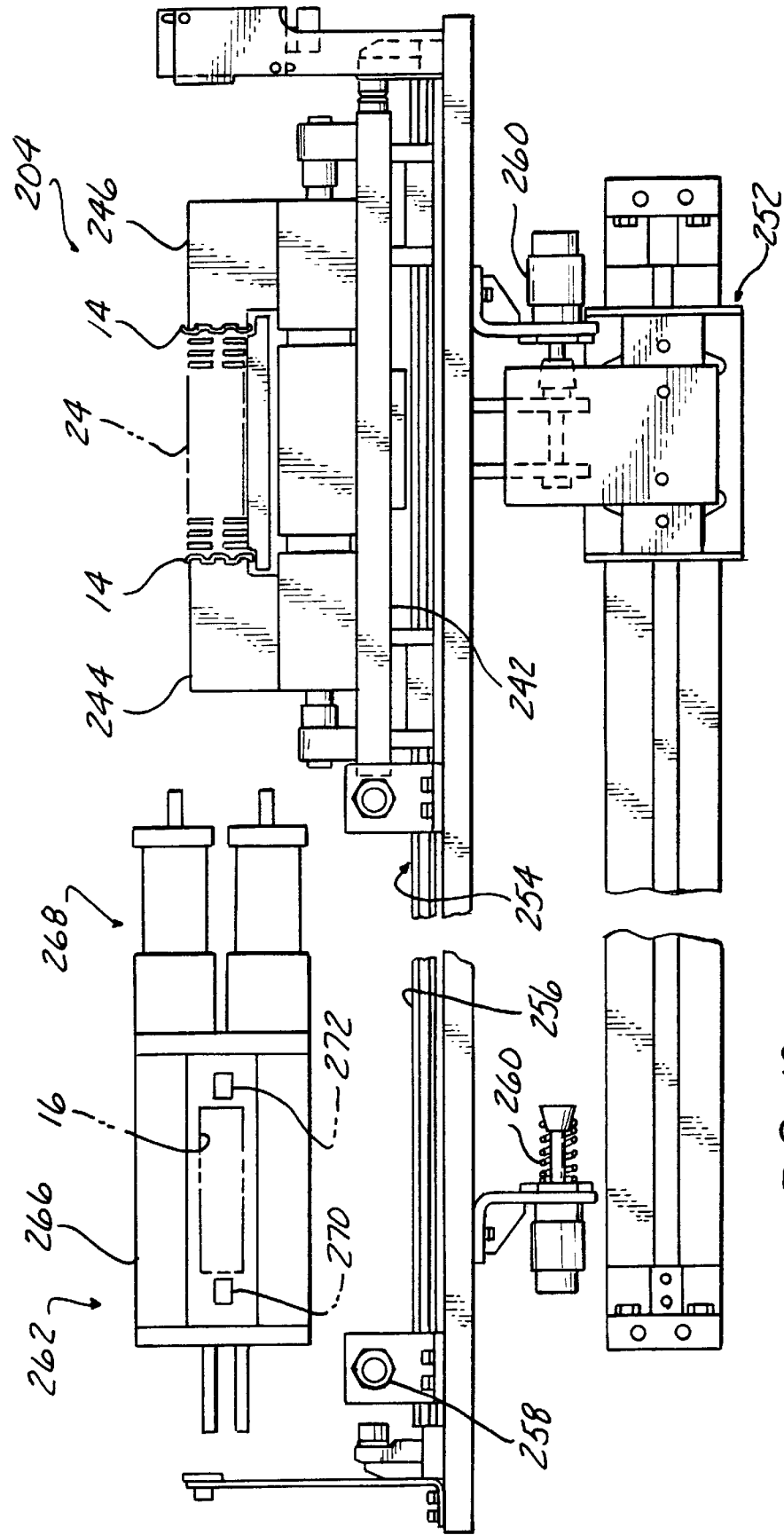
FIG. 18 is a front elevational view of shuttle means according to the present invention for moving the layered stack along a fixed path from the shuttle-means-loading position to an end plate assembly position.

Referring now to the bottom portion of FIG. 17 and FIG. 18, the tool align and core compress assembly 204 is described in greater detail. The tube align and core compress assembly 204 can include a third carriage frame 242. The third carriage frame 242 preferably includes first and second movable portions 244 and 246 respectively carried by the third carriage frame 242. The first and second movable portions 244 and 246 are movable with respect to one another and with respect to the third carriage frame 242 to engage the first and second side plates 14 of the layered stack 24 to compress and align the heat exchanger core. Any suitable means can be provided for driving the first and second movable portions 244 and 246 with respect to one another in order to compress the layered stack 24. The second transfer station located at the first end limit of travel of the third carriage frame 242 includes first and second alignment members (not shown) movable with respect to one another to engage opposite ends of the layered stack for aligning the tubes 18 and fin plates 20 with respect to the side plates 14 prior to compression with the first and second moveable portions 244 and 246. Any suitable means can be provided for moving the first and second alignment members with respect to one another in order to align the layered stack prior to compression. After the opposite ends of the tubes 18 and fin plates 20 have been aligned by the first and second alignment members and compressed by the first and second movable portions 244 and 246, the third carriage frame 242 is driven by third motor means 252 between first and second end limits of travel. The third motor means 252 can take any suitable form. By way of example and not limitation, the third motor means 252 may take the form of a TOL-A-MATIC band slide similar to that described with respect to the first and second motor means. Third guide means 254 can be provided for guiding the third carriage frame 242 between the first and second positions. The third guide means 254 can include at least one rail 256 extending between the first and second positions of the third carriage frame 242. Suitable sensors 258 can be provided for signaling when the third carriage frame 242 is in the first or second end limit of travel. Suitable shock absorbing stops 260 can be provided for controlling the third carriage frame 242 as it approaches the first or second end limit of travel along the third guide means 254. The second end limit of travel of the third carriage frame 242 corresponds to a header setter and tab bending assembly 262 seen best to the left of FIG. 1 and partially seen in FIG. 2. At this station, the first and second end plates 16 are moved into position adjacent opposite ends of the tubes 18 and fin plates 20 for attachment to the first and second side plates 14 by bending appropriate tabs to hold the side plates 14 and end plates 16 with respect to one another thereby resulting in an assembled heat exchanger core 12. The header setter and tab bending assembly 262 can include first and second opposing members 264 and 266, for carrying the end plates 16 between engaged and disengaged positions with respect to opposing ends of the layered stack 24 best seen in FIG. 1. The first and second opposing members 264 and 266 can be movable between the engaged and disengaged position by any suitable means. The first and second members 264 and 266 carry tab bending means 268 movable with respect to the members 264 and 266 for bending tabs extending between the side plates 14 and end plates 16 with tab-bending anvils 270, 272 to hold the side plates 14 and end plates 16 with respect to one another. After completion of the tab bending process, the opposing members 264 and 266 are moved back to the disengaged position and the movable portions 244 and 246 of the third carriage frame 242 are moved to a relaxed position with respect to one another in order to release the completed heat exchanger core 12. The third carriage frame 242 is then returned to the first end limit of travel in order to receive another layered stack 24 to repeat the core alignment, compression, header setting and tab bending cycle.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for assembling a heat exchanger core having first and second side plates, said side plates cooperating with first and second end plates to sandwich a plurality of layered tubes and fin plates therebetween, the apparatus comprising:

lifting means for stacking said tubes and said fin plates with respect to one another to define a layered stack having opposite sides and opposite ends, wherein said lifting means includes first and second endless conveyors having first and second part-engaging surfaces respectively, said first conveyor rotating in an opposite direction from said second conveyor so that parts carried by said first and second part-engaging surfaces move from a first position to a second position along a fixed path of travel during assembly;

side plate assembling means for associating said first and second side plates on opposite sides of said layered stack; and end plate assembling means for associating said first and second end plates on opposite ends of said layered stack.

2. The apparatus of claim 1 further comprising:

tube loading means for loading tubes on said lifting means in spaced parallel relationship to one another.

3. The apparatus of claim 1 further comprising:

fin plate loading means for loading fin plates on said lifting means in spaced parallel relationship to one another.

4. The apparatus of claim 1 wherein said first and second conveyors further comprise:

a plurality of links assembled in a continuous chain, each link having at least one part-engaging surface and a roller engageable with a cam surface for moving the part-engaging surface from an extended position to a retracted position.

5. The apparatus of claim 1 wherein said first and second conveyors further comprise:

a first-side-plate-loading station on said fixed path disposed between said first and second positions;

a tube-loading station on said fixed path disposed between said first and second positions; and a fin-plate-loading station on said fixed path disposed between said first and second positions.

6. The apparatus of claim 1 further comprising:

transfer means for moving said layered stack from said lifting means to said end plate assembling means.

7. The apparatus of claim 6 wherein said transfer means further comprises:

carrier means for engaging and holding said layered stack at one end of said lifting means, said carrier means for rotating said layered stack through approximately 90° of rotation with respect to a axis and for transporting said layered stack along a fixed transfer path from a lift-means-unloading position to a transfer position.

8. The apparatus of claim 7 wherein said transfer means further comprises:

elevator means for engaging and holding the layered stack at said transfer position of said carrier means, said elevator means for rotating said layered stack through approximately 90° of rotation with respect to a horizontal axis and for transporting said layered stack along a fixed path from said transfer position to a shuttle-means-loading position.

9. The apparatus of claim 8 wherein said transfer means further comprises:

shuttle means for engaging and holding said layered stack at said shuttle-means-loading position, said shuttle means for moving said layered stack along a fixed path from said shuttle-means-loading position to an end plate assembly position; and said end plate assembling means supporting said first and second end plates at said end plate assembly position for engagement with said layered stack and for connecting said first and second end plates with respect to said first and second side plates to define an assembled heat exchanger core.

10. An apparatus for assembling a heat exchanger core having first and second side plates, said side plates cooperating with first and second end plates to sandwich a plurality of layered tubes and fin plates therebetween, the apparatus comprising:

conveyor means for stacking said tubes and said fin plates with respect to one another to define a layered stack having opposite sides and opposite ends;

tube loading means for loading tubes on said conveyor means in spaced parallel relationship to one another;

fin plate loading means for loading fin plates on said conveyor means in spaced parallel relationship to one another;

side plate assembling means for associating said first and second side plates on opposite sides of said layered stack;

end plate assembling means for associating said first and second end plates on opposite ends of said layered stack; and transfer means for moving said layered stack from said conveyor means to said end plate assembling means, wherein said transfer means includes carrier means for engaging and holding said layered stack at one end of said conveyor means, said carrier means for rotating said layered stack through approximately 90° of rotation with respect to a vertical axis and for transporting said layered stack along a fixed transfer path from a conveyor-means-unloading position to a transfer position.

11. The apparatus of claim 10 wherein said conveyor means further comprises:

first and second endless conveyors having first and second part-engaging surfaces respectively, said first conveyor rotating in an opposite direction from said second conveyor so that parts carried by said first and second part-engaging surfaces move from a first position to a second position along a fixed path of travel during assembly.

12. The apparatus of claim 11 wherein said first and second conveyors further comprise:

a plurality of links assembled in a continuous chain, each link having at least one part-engaging surface and a roller engageable with a cam surface for moving the part-engaging surface from an extended position to a retracted position.

13. The apparatus of claim 11 wherein said first and second conveyors further comprise:

a tube-loading station on said fixed path disposed between said first and second positions;

a first-side-plate loading station on said fixed path between said tube-loading station and said second position; and a fin-plate-loading station on said fixed path disposed between said first-side-plate-loading station and said second position.

14. The apparatus of claim 10 wherein said transfer means further comprises:

elevator means for engaging and holding the layered stack at said transfer position of said carrier means, said elevator means for rotating said layered stack through approximately 90° of rotation with respect to a horizontal axis and for transporting said layered stack along a fixed path from said transfer position to a shuttle-means-loading position.

15. The apparatus of claim 14 wherein said transfer means further comprises:

shuttle means for engaging and holding said layered stack at said shuttle-means-loading position, said shuttle means for moving said layered stack along a fixed path from said shuttle-means-loading position to an end plate assembly position; and said end plate assembling means supporting said first and second end plates at said end plate assembly position for engagement with said layered stack and for connecting said first and second end plates with respect to said first and second side plates to define an assembled heat exchanger core.

16. An apparatus for assembling a heat exchanger core having first and second side plates, said side plates cooperating with first and second end plates to sandwich a plurality of layered tubes and fin plates therebetween, the apparatus comprising:

conveyor means for stacking said tubes and said fin plates with respect to one another to define a layered stack having opposite sides and opposite ends, wherein said conveyor means includes first and second endless conveyors having first and second part-engaging surfaces respectively, said first conveyor rotating in an opposite direction from said second conveyor so that parts carried by said first and second part-engaging surfaces move from a first position to a second position along a fixed path of travel during assembly;

tube loading means for loading tubes on said conveyor means in spaced parallel relationship to one another;

fin plate loading means for loading fin plates on said conveyor means in spaced parallel relationship to one another;

side plate assembling means for associating said first and second side plates on opposite sides of said layered stack;

end plate assembling means for associating said first and second end plates on opposite ends of said layered stack; and transfer means for moving said layered stack from said conveyor means to said end plate assembling means.

17. The apparatus of claim 16 further comprising:

a plurality of links assembled in a continuous chain, each link having at least one part-engaging surface and a roller engageable with a cam surface for moving the part-engaging surface from an extended position to a retracted position.

* * * * *